July 5, 1932. H. M. GILSON 1,865,686
COMBINED THRESHER SPREADER
Filed June 9, 1931 2 Sheets-Sheet 1
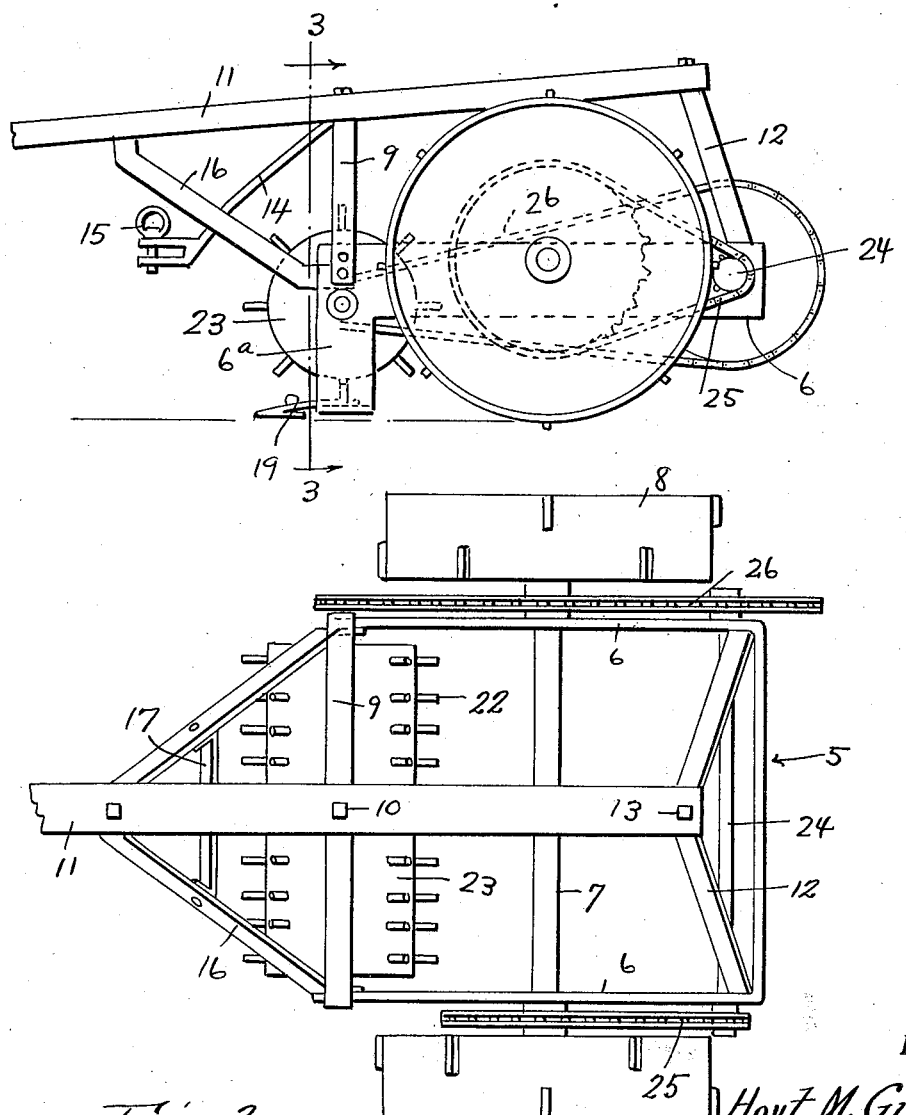
Inventor
Hoyt M. Gilson
By Clarence A. O'Brien
Attorney July 5, 1932.  H. M. GILSON  1,865,686
COMBINED THRESHER SPREADER
Filed June 9, 1931    2 Sheets-Sheet 2
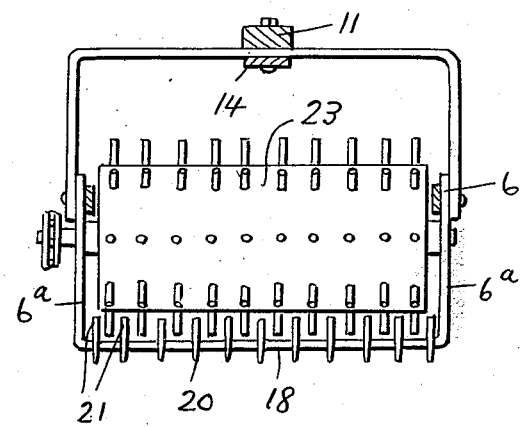
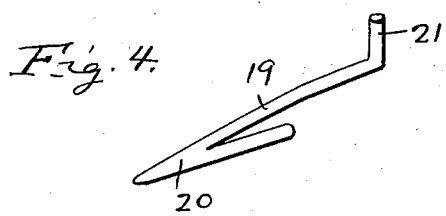
Inventor
Hoyt M. Gilson
By Clarence A. O'Brien
Attorney Patented July 5, 1932

1,865,686

UNITED STATES PATENT OFFICE

HOYT M. GILSON, OF OCHELTREE, KANSAS

COMBINED THRESHER-SPREADER

Application filed June 9, 1931. Serial No. 543,216.

The object of this invention is to provide an agricultural machine especially adapted for threshing corn stalks and the like and subsequently spreading the threshed stalks on the ground, after which the ground may be plowed or otherwise worked.

A still further object of the invention is to provide a means for the purpose above specified, which will obviate the necessity of raking and burning stalks as is now the common practice.

Other objects and advantages of the invention will be best apparent from a study of the following description, taken in connection with the accompanying drawings wherein:

Figure 1 is a side elevational view thereof.

Figure 2 is a top plan view thereof.

Figure 3 is a vertical transverse sectional view taken substantially on the line 3—3 of Figure 1.

Figure 4 is a perspective view of a pick up finger.

Referring to the drawings, it will be seen that my combined thresher and spreader comprises a substantially U-shaped frame 5 between the opposite sides 6 of which is journalled an axle 7 provided on its end with suitable tread wheels 8. The forward ends of the side members 6 are connected by an inverted U-shaped bar 9 to which is bolted as at 10 an intermediate portion of a draft tongue 11. Rising from the frame 5 adjacent the rear end of the sides 6 thereof is a forwardly and upwardly inclined substantially inverted V-shaped brace 12 to which at the apex thereof is secured the rear end of the draft tongue 11 as at 13.

Extending downwardly and forwardly from the cross member of the inverted U-shaped frame 9 is a hitch pole 14, bifurcated at its forward end and having a locking bolt 15 suitably associated with the bifurcated end, whereby to retain an equalizing bar within the furcation. Thus it will be seen that suitable means is provided for hitching a team of horses or like draft animals to the machine.

The forward end of the draft tongue 11 is braced with respect to the side members 6 of the frame 5 through the medium of forwardly and upwardly extending brace bars 16 braced relative to each other by a cross bar 17.

The side members 6 of the frame 5 at their forward ends are provided with depending extensions 6a connected at their lower ends by a horizontally disposed combined concave and spreader bar 18.

Extending forwardly from the bar 18 is a plurality of relatively spaced pick up fingers 19 suitably secured adjacent their rear ends to the bar 18.

As shown in Figure 4, each of the pick up fingers 19 is formed from a single blank of suitable metal, provided at its forward end with a pick up point 20, and at its rear end with a vertical upstanding tooth 21.

The teeth 21 of the fingers 19 cooperate with the teeth 22 of a threshing cylinder or drum 23 that is rotatably supported between the forward end of the side frame members 6, above the concave and spreader bar 18.

Suitably journalled between the rear ends of the side members 6 of the frame is a power transmitting shaft 24 that is driven from the axle 7 through the medium of a chain and sprocket drive connection 25. Power from the shaft 24 is transmitted to the shaft of the drum 23 through the medium of a suitable chain and sprocket drive connection 26.

In actual practice then it will be seen that the machine is drawn over the ground by a team of horses or other suitable draft means, and along a row of corn stalks. The pick up teeth 20 will serve to pick up any fallen stalks, and the stalks will be threshed and broken up by contact with the teeth 22 of the rotating drum 23 cooperating with the teeth 21. The particles of the threshed stalks will of course fall to the ground, and be spread over the ground by the bar 18.

Even though I have herein shown and described the preferred embodiment of the invention, it is to be understood that the same is susceptible of further changes, modifications and improvements coming within the scope of the appended claims.

Having thus described my invention, what I claim as new is:

1. A machine of the character described comprising in combination a frame, an axle journalled transversely of the frame, said wheels supported on the end of the axle, brackets supported on the frame adjacent the front and rear thereof, a draft tongue supported by said brackets, and brace means for bracing the forward end of said tongue with respect to said frame, a threshing cylinder supported adjacent the forward end of the frame, said frame having opposite side members thereof provided with depending extensions, and a combined concave and spreader bar connecting said extensions.

2. A machine of the character described comprising in combination a frame, an axle journalled transversely of the frame, said wheels supported on the end of the axle brackets supported on the frame adjacent the front and rear thereof, a draft tongue supported by said brackets, and brace means for bracing the forward end of said tongue with respect to said frame, a threshing cylinder supported adjacent the forward end of the frame, said frame having opposite side members thereof provided with depending extensions, and a combined concave and spreader bar connecting said extensions, pick up fingers extending forwardly from said combined concave and spreader bar, and vertical fingers extending upwardly from said bar for cooperation with the threshing fingers of said cylinder.

3. A machine of the character described comprising in combination a frame, an axle journalled transversely of the frame, said wheels supported on the end of the axle brackets supported on the frame adjacent the front and rear thereof, a draft tongue supported by said brackets, and brace means for bracing the forward end of said tongue with respect to said frame, a threshing cylinder supported adjacent the forward end of the frame, said frame having opposite side members thereof provided with depending extensions, and a combined concave and spreader bar connecting said extensions, pick up fingers extending forwardly from said combined concave and spreader bar, and vertical fingers extending upwardly from said bar for cooperation with the threshing fingers of said cylinder, a hitch pole extending downwardly and forwardly from said brace member at the forward end of the frame, and means for transmitting power from said axle to said threshing cylinder.

In testimony whereof I affix my signature.

HOYT M. GILSON.